Patented Jan. 16, 1940

2,187,702

UNITED STATES PATENT OFFICE 2,187,702

BARBITURIC ACIDS

Arthur C. Cope, Bryn Mawr, Pa., assignor to Sharp & Dohme, Incorporated, Philadelphia, Pa., a corporation of Maryland No Drawing. Application March 14, 1939, Serial No. 261,769

12 Claims. (Cl. 260—257)

This invention relates to new derivatives of barbituric acid. It relates more particularly to new N-alkyl 5-$\Delta_1$-alkenyl barbituric acids, in the form of free acids or salts.

The new compounds of the present invention are valuable therapeutically as sleep-inducing agents, that is, as hypnotics, soporifics, sedatives, anaesthetics, etc. In general, they have a high therapeutic ratio, that is, ratio of lethal dose to narcotic or effective dose, with minimum side reactions or deleterious effects when administered in therapeutic doses.

The new barbituric acid derivatives of the invention include various barbituric acid derivatives in which the two hydrogens attached to the methylene carbon are replaced, one by a $\Delta_1$-alkenyl group and the other by an alkyl group or an alicyclic hydrocarbon group such as the cyclohexyl, cyclopentyl or cyclopropyl groups, which may be substituted or unsubstituted, and in which one of the nitrogen-linked hydrogens of the barbituric acid is replaced by an alkyl group, which may be saturated or unsaturated, but which advantageously contains from one to three carbon atoms. These new acids may be represented by the graphic formula:

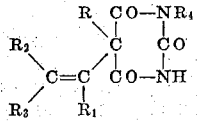

in which R represents an alkyl or alicyclic group, which may be substituted, e. g., by a halogen atom, and in which any two of the radicals $R_1$, $R_2$, and $R_3$ may be hydrogen, but at least one of which must be an alkyl group, or in which one of these radicals may be hydrogen and the other two alkyl groups, or in which all three may be alkyl groups, and in which $R_4$ represents an alkyl group, which may be saturated or unsaturated, and advantageously contains from one to three carbon atoms. The group

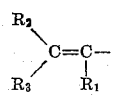

is herein referred to as a $\Delta_1$-alkenyl group. For convenience, where $R_1$ is alkyl, the group is referred to as a secondary $\Delta_1$-alkenyl group and where $R_1$ is hydrogen, as a primary $\Delta_1$-alkenyl group. These compounds have a nitrogen-linked hydrogen capable of being replaced to form salts, and salts of the acids may be readily prepared by replacing this hydrogen by a monovalent metal, such as sodium or potassium, or an equivalent of a polyvalent metal, such as the alkaline earth metals, e. g., calcium or magnesium, or a nitrogen base, such as ammonia, primary, secondary or tertiary amines, such as alkylamines, dialkylamines, and trialkylamines, such as ethylamine, or diethylamine, alkynolamines, such as diethanolamine, ephedrine, cocaine, phenylpropanolamine, or the like, these salts being readily formed from the corresponding acids by the usual procedure, and being included in the invention.

The new compounds of the invention may be prepared by various methods. One advantageous method consists in condensing the corresponding malonic or cyanoacetic ester with an N-alkyl urea in the presence of sodium ethoxide or other suitable condensing agent. Another advantageous method consists in forming the corresponding 5,5-disubstituted barbituric acid, with subsequent treatment of this barbituric acid with an alkyl salt in the presence of an agent capable of transforming the barbituric acid into a metal derivative, such as sodium hydroxide or ethoxide, with introduction of the alkyl group on one of the nitrogen atoms. Of course, if the cyanoacetic esters are used for the formation of the new compounds by direct reaction with an N-alkyl urea, the condensation will result in the production of an imino derivative which requires hydrolysis to remove the imino group and form the barbituric acid. Preparation of outstanding members of the new group of compounds will be illustrated by the following specific examples, but the invention is not limited thereto.

*Example 1.*—5-ethyl 5-isopropenyl N-methyl barbituric acid is prepared by condensing methyl urea with the ethyl ester of ethyl isopropenyl malonic acid by dissolving 6.9 parts of sodium in 100 parts of absolute ethyl alcohol, adding to the resulting solution 9.6 parts of methyl urea and 22.8 parts of the ethyl ester of ethyl isopropenyl malonic acid and refluxing the mixture for twelve hours. The alcohol is removed in vacuo, and the residue is dissolved in 100 parts of water. The solution is then extracted with three 25 part portions of ether. The ether extract is then washed with two 10 part portions of water, the water solutions are combined, cooled in an ice bath and acidified by the addition of 39 parts of concentrated hydrochloric acid, with stirring. The barbituric acid which crystallizes out is filtered and washed with two 25 part portions of ice water. A 48% yield of the crude 5-ethyl 5-isopropenyl N-methyl barbituric acid is obtained. After recrystallization from dilute alcohol, the yield is 44.3%. The purified product melts at 125.5–126° C.

*Example 2.*—5-methyl 5-(1-methyl-$\Delta_1$-butenyl) N-methyl barbituric acid is prepared from methyl urea and the mixed ethyl and isopropyl esters of methyl (1-methyl-$\Delta_1$-butenyl) cyanoacetic acid by dissolving 4.6 parts of sodium in 100 parts of absolute isopropyl alcohol, adding 8.2 parts of methyl urea and 19.5 parts of the mixed ethyl and isopropyl esters of methyl (1-methyl-$\Delta_1$-butenyl) cyanoacetic acid. The resulting mixture is refluxed for twelve hours, the alcohol is removed in vacuo, and the residue is dissolved in 100 parts of water. The resulting solution is extracted with three 25 part portions of ether, and the resulting ether extract is washed with two 10 part portions of water. The combined water solutions are acidified to Congo red with concentrated hydrochloric acid, their volume is measured, and an equal volume of concentrated hydrochloric acid is added. The resulting solution is refluxed for one and one-half hours, using a still head and distilling out about one-fourth of the original volume to remove any ether and alcohol present and to insure a 20% hydrochloric acid concentration to accomplish the hydrolysis of the imino barbituric acid formed in the condensation to the desired barbituric acid. The barbituric acid separates as an oil. The mixture is cooled, the hydrochloric acid is decanted and the semisolid remaining mass is washed with ice water. This impure barbituric acid is dissolved in benzene, boiled with a clarifying agent such as Norite, and the mixture is filtered. Pentane is added to the filtrate to precipitate the barbituric acid. After two recrystallizations, the pure product is obtained in 23% yield. It has a melting point of 75.5–77° C.

*Example 3.*—5-ethyl 5-(1-methyl-$\Delta_1$-butenyl) N-methyl barbituric acid is prepared from methyl urea and the ethyl ester of ethyl (1-methyl-$\Delta_1$-butenyl) cyanoacetic acid by the procedure of Example 2. The pure product is obtained in a 19% yield. It melts at 53–55° C.

*Example 4.*—5-ethyl 5-(1-methyl-$\Delta_1$-butenyl) N-methyl barbituric acid is prepared from dimethyl sulfate and 5-ethyl 5-(1-methyl-$\Delta_1$-butenyl) barbituric acid by dissolving 22 parts of 5-ethyl 5-(1-methyl-$\Delta_1$-butenyl) barbituric acid in 29.4 parts of 3.74 normal sodium hydroxide solution and 172 parts of water, adding to the resulting solution 13.9 parts of redistilled dimethyl sulfate, and stirring for ten minutes. An oily material slowly separates. The mixture is then warmed in a water bath to 50° C. After thirty minutes of warming, it is neutral to litmus. It is then made distinctly alkaline with 50 parts of 6 normal caustic soda solution and is extracted with three 25 part portions of ether to remove any unreacted dimethyl sulfate and any of the dimethyl barbituric acid derivative formed by methylation of both nitrogen atoms. The aqueous solution is then acidified to Congo red with concentrated hydrochloric acid and extracted with three 50 part portions of ether. The resulting ether extracts are washed with two 10 part portions of water. On evaporation of the ether, an oil remains which solidifies when left in the ice-box for several days. It is the desired barbituric acid in impure state, and is dried in a vacuum desiccator and dissolved in dry ether. The resulting solution is filtered to remove unreacted 5-ethyl 5-(1-methyl-$\Delta_1$-butenyl) barbituric acid, which is not readily soluble in dry ether. Pentane is then added to the filtrate, the solution is cooled and is filtered several times to remove unreacted 5-ethyl 5-(1-methyl-$\Delta_1$-butenyl) barbituric acid. The desired N-methyl barbituric acid finally crystallizes in large transparent crystals, is removed by filtration and recrystallized from ether and pentane. It is obtained in 24% yield. It melts at 53–55° C.

*Example 5.*—5-ethyl 5-isopropyl N-ethyl barbituric acid is prepared from the ethyl ester of ethyl isopropenyl malonic acid and ethyl urea by the process of Example 1. The product is obtained, after two recrystallizations from ether and pentane, in a yield of 12%. It melts at 67–68° C.

*Example 6.*—5-ethyl 5-isopropenyl N-allyl barbituric acid is prepared from allyl urea and the ethyl ester of ethyl isopropenyl malonic acid by the procedure of Example 1. The product after recrystallization from ether and pentane is obtained in 14.4% yield. It melts at 65–66° C.

*Example 7.*—5-ethyl 5-(1-methyl-$\Delta_1$-propenyl) N-methyl barbituric acid is prepared from methyl urea and the ethyl ester of ethyl (1-methyl-$\Delta_1$-propenyl) malonic acid by the procedure of Example 1. After two crystallizations from benzene and pentane the product is obtained in 48.5% yield. It melts at 103–104° C.

The 5-alkyl 5-$\Delta_1$-alkenyl barbituric acids which may be used for the production of the corresponding 5-alkyl 5-$\Delta_1$-alkenyl N-alkyl barbituric acids of the present invention are advantageously prepared from the corresponding $\Delta_1$-alkenyl alkyl malonic or cyanoacetic esters by the process described in my application Serial No. 105,826, filed October 15, 1936, by reaction of the malonic or cyanoacetic ester with urea, guanidine or the like, with hydrolysis of the resulting imino barbituric acids if the cyanoacetic ester is used as the intermediate.

The alkyl $\Delta_1$-alkenyl malonic and cyanoacetic esters which may be combined directly with alkyl ureas or the like to form the new compounds of the present invention, or may be used as intermediates to form the 5-alkyl 5-$\Delta_1$-alkenyl barbituric acids which are subsequently converted to the N-substituted compounds, are advantageously prepared by the methods described in application Serial Nos. 105,820, 105,821, 105,823, filed October 15, 1936, and Patent 2,119,526.

A wide range of 5-alkyl 5-$\Delta_1$-alkenyl N-alkyl barbituric acids, including both the secondary $\Delta_1$-alkenyl and primary $\Delta_1$-alkenyl compounds, may be prepared in accordance with the present invention, and are included as new products within the scope of the invention. Included among the new barbituric acids of the invention, which are readily prepared by the process of the foregoing examples, are compounds in which the $\Delta_1$-alkenyl group may be one of the following:

Isopropenyl
Propenyl
1-methyl-$\Delta_1$-n-propenyl
1-methyl-$\Delta_1$-butenyl (normal or iso)
1-methyl-$\Delta_1$-pentenyl (normal or iso)
$\Delta_1$-butenyl (normal or iso)
$\Delta_1$-pentenyl (normal or iso)
$\Delta_1$-hexenyl (normal or iso)
1-ethyl-$\Delta_1$-propenyl
1-butyl-$\Delta_1$-propenyl and others, and in which the 5-alkyl group may be one of the following:

Methyl
Ethyl
Propyl (normal or iso)
Butyl (normal, iso or secondary)
Allyl
Crotyl
Amyl (normal, iso or secondary)

and others, and in which the N-alkyl group may be one of the following:

Methyl
Ethyl
Propyl (normal or iso)
Allyl
Butyl
Amyl
Crotyl and others. Advantageously, the $\Delta_1$-alkenyl group will contain from four to six carbon atoms, the 5-alkyl group from one to three carbon atoms, and the N-alkyl group from one to three carbon atoms, and the total number of carbon atoms in the $\Delta_1$-alkenyl group, the 5-alkyl group, and the N-alkyl group will be from six to eight carbon atoms. Certain of the secondary $\Delta_1$-alkenyl compounds in this group have important advantages, particularly 5-ethyl 5-isopropenyl N-methyl barbituric acid, 5-methyl 5-(1-methyl-$\Delta_1$-butenyl) N-methyl barbituric acid, 5-ethyl 5-(1-methyl-$\Delta_1$-butenyl) N-methyl barbituric acid, 5-ethyl 5-isopropenyl N-ethyl barbituric acid, 5-ethyl 5-isopropenyl N-allyl barbituric acid and 5-ethyl 5-(1-methyl-$\Delta_1$-propenyl) N-methyl barbituric acid.

These new compounds have uniformly high therapeutic ratios, i. e., ratio of toxic dose to effective or narcotic dose, which is important, as the therapeutic ratio in effect determines the margin of safety of the compounds in use, are effective in small dosage, and produce a minimum of undesired or side reactions, e. g. effects on other centers than the higher nerve centers.

These new 5-alkyl 5-$\Delta_1$-alkenyl barbituric acids have a nitrogen-linked hydrogen replaceable by a metal, or a nitrogen base, and hence it is possible to form salts of these acids. For example, the sodium salts may be conveniently prepared by reacting one of the free acids with an equivalent of sodium ethoxide in absolute alcohol. If the resulting salt is too soluble in alcohol to be readily separated, it may be precipitated by the addition of ether, ligroin, or the like. Other salts are similarly prepared from corresponding bases, with replacement of the nitrogen-linked hydrogen with an equivalent of a metal such as sodium, potassium, calcium, magnesium, etc., or a nitrogen base, such as ammonia, or a mono-, di- or trialkyl amine, etc. Methods of preparing the salts from the free acids are well known, and require no further description here.

I claim:

1. 5-alkyl 5-$\Delta_1$-alkenyl N-alkyl barbituric acids in which the 5-$\Delta_1$-alkenyl group is an open chain group having at least three carbon atoms.

2. 5-alkyl 5-sec.-$\Delta_1$-alkenyl N-alkyl barbituric acids in which the 5-sec.-$\Delta_1$-alkenyl group is an open chain.

3. 5-alkyl 5-$\Delta_1$-alkenyl N-alkyl barbituric acids in which the total number of carbon atoms in the 5-alkyl group, the 5-$\Delta_1$-alkenyl group, and the N-alkyl group is from six to eight and in which the 5-$\Delta_1$-alkenyl group is an open chain group having at least three carbon atoms.

4. 5-alkyl 5 sec.-$\Delta_1$-alkenyl N-alkyl barbituric acids in which the total number of carbon atoms in the 5-alkyl group, the 5-sec.-$\Delta_1$-alkenyl group, and the N-alkyl group is from six to eight and in which the 5-sec.-$\Delta_1$-alkenyl group is an open chain.

5. 5-alkyl 5-$\Delta_1$-alkenyl N-alkyl barbituric acids in which the 5-$\Delta_1$-alkenyl group is an open chain group having not less than four and not more than five carbon atoms.

6. 5-alkyl 5-sec.-$\Delta_1$-alkenyl N-alkyl barbituric acids in which the 5-sec.-$\Delta_1$-alkenyl group is an open chain group having not less than four and not more than five carbon atoms.

7. 5-alkyl 5-$\Delta_1$-alkenyl N-alkyl barbituric acids in which the N-alkyl group has from one to three carbon atoms and in which the 5-$\Delta_1$-alkenyl group is an open chain group having at least three carbon atoms.

8. 5-alkyl 5-$\Delta_1$-alkenyl N-alkyl barbituric acids in which the 5-$\Delta_1$-alkenyl group is an open chain group having not less than four and not more than five carbon atoms, the N-alkyl group has from one to three carbon atoms, and the total number of carbon atoms in the 5-$\Delta_1$-alkenyl group, the 5-alkyl group, and the N-alkyl group is from six to eight.

9. 5-alkyl 5-sec.-$\Delta_1$-alkenyl N-alkyl barbituric acids in which the 5-sec.-$\Delta_1$-alkenyl group is an open chain group having not less than four and not more than five carbon atoms, the N-alkyl group has from one to three carbon atoms, and the total number of carbon atoms in the 5-sec.-$\Delta_1$-alkenyl group, the 5-alkyl group, and the N-alkyl group is from six to eight.

10. 5-ethyl 5-isopropenyl N-methyl barbituric acid.

11. 5-methyl 5-(1-methyl-$\Delta_1$-butenyl) N-methyl barbituric acid.

12. 5-ethyl 5-(1-methyl-$\Delta_1$-butenyl) N-methyl barbituric acid.

ARTHUR C. COPE.